US011214306B2

(12) United States Patent
Maruyama et al.

(10) Patent No.: US 11,214,306 B2
(45) Date of Patent: Jan. 4, 2022

(54) VEHICLE SUPPORT STRUCTURE AND METHOD OF MANUFACTURING SAME

(71) Applicant: NISSIN KOGYO CO., LTD., Tomi (JP)

(72) Inventors: Yasuhiro Maruyama, Tomi (JP); Susumu Yodono, Tomi (JP)

(73) Assignee: NISSIN KOGYO CO., LTD., Nagano (JP)

( * ) Notice: Subject to any disclaimer, the term of this patent is extended or adjusted under 35 U.S.C. 154(b) by 2 days.

(21) Appl. No.: 16/820,830

(22) Filed: Mar. 17, 2020

(65) Prior Publication Data

US 2020/0307689 A1    Oct. 1, 2020

(30) Foreign Application Priority Data

Mar. 29, 2019    (JP) .............................. JP2019-066762

(51) Int. Cl.
| | |
|---|---|
| *B62D 7/18* | (2006.01) |
| *B23C 3/00* | (2006.01) |
| *B22D 25/02* | (2006.01) |

(52) U.S. Cl.
CPC ............... *B62D 7/18* (2013.01); *B22D 25/02* (2013.01); *B23C 3/00* (2013.01); *B60G 2206/50* (2013.01)

(58) Field of Classification Search
CPC .............. B62D 7/18; B60G 2206/8101; B60G 2206/50
USPC ..................................................... 280/93.512
See application file for complete search history.

(56) References Cited

U.S. PATENT DOCUMENTS

2010/0098483 A1*   4/2010   Toepker ................. B23K 9/167
                                                                  403/271

FOREIGN PATENT DOCUMENTS

| FR | 2989050 A1 * | 10/2013 | ........... B21C 23/142 |
|---|---|---|---|
| JP | 2001114127 | 4/2001 | |
| JP | 2004090034 | 3/2004 | |
| JP | 2010069962 | 4/2010 | |
| JP | 2014091469 | 5/2014 | |
| JP | 2014091469 A * | 5/2014 | |
| JP | 2015107743 | 6/2015 | |
| JP | 2015107743 A * | 6/2015 | |
| JP | 6392591 | 4/2016 | |
| JP | 2017081427 | 5/2017 | |

OTHER PUBLICATIONS

Japanese Office Action in related JP Application No. 2019-06676 dated Jun. 8, 2021, 6 pages.

* cited by examiner

*Primary Examiner* — Keith J Frisby
(74) *Attorney, Agent, or Firm* — Andrew M. Calderon; Roberts Calderon Safran & Cole, P.C.

(57) ABSTRACT

A vehicle support structure formed by casting, the vehicle support structure includes a main body part attached to a vehicle side, a plurality of support portions extending from the main body part to support vehicle components, and a plurality of rib portions configured to connect the support portions and the main body part, respectively. A lightening portion is formed by casting at least in one of the rib portions. An external component mounting portion is formed in the lightening portion.

17 Claims, 3 Drawing Sheets

VEHICLE SUPPORT STRUCTURE AND METHOD OF MANUFACTURING SAME

CROSS-REFERENCE TO RELATED APPLICATIONS

This application is based upon and claims the benefit of priority from prior Japanese patent application Nos. 2019-066762, filed on Mar. 29, 2019, the entire contents of which is incorporated herein by reference.

TECHNICAL FIELD

The present disclosure relates to a vehicle support structure and a method of manufacturing same.

BACKGROUND

A vehicle support structure is a structure attached to a vehicle side. As an example, a vehicle support structure is a component of a steering axle. Rigidity and weight reduction for improving fuel efficiency and the like are required for a vehicle support structure.

Conventionally, a vehicle support structure made of aluminum is known (refer to JP-B-6392591).

SUMMARY

The vehicle support structure made of aluminum as disclosed in JP-B-6392591 needs to be thickened in order to obtain the same rigidity as a vehicle support structure made of iron. In particular, a portion to which a large load is applied, such as an arm support portion, needs to be cast thick. However, as an example, when the arm support portion is cast thick, the external component mounting portion provided around the arm support portion also becomes thick similarly. Thus, there has been a problem that the machining allowance of the external component mounting portion increases, and the number of processing steps increases.

The disclosure has been made in view of the above circumstances, and an object thereof is to provide a vehicle support structure capable of reducing the machining allowance of an external component mounting portion while ensuring the required rigidity, as compared with the related art, and a method of manufacturing the vehicle support structure.

As an embodiment, the above problem is addressed by the solutions as disclosed below.

A vehicle support structure formed by casting, the vehicle support structure including:

a main body part attached to a vehicle side;

a plurality of support portions extending from the main body part to support vehicle components, and a plurality of rib portions configured to connect the support portions and the main body part, respectively.

A lightening portion is formed by casting at least in one of the rib portions.

An external component mounting portion is formed in the lightening portion.

According to this configuration, the external component mounting portion is formed in the lightening portion. In this way, it is possible to provide the vehicle support structure which is capable of reducing the machining allowance of the external component mounting portion to the minimum required while ensuring the required rigidity.

Preferably, the vehicle support structure may be made of aluminum or aluminum alloy. With this configuration, weight reduction can be achieved.

Preferably, the one rib portion in which the lightening portion may be formed connects the largest one of the support portions and the main body part. With this configuration, since the unnecessary portions of the largest rib portions are removed, further weight reduction can be achieved.

A method of manufacturing a vehicle support structure, the vehicle support structure including a main body part attached to a vehicle side; a plurality of support portions extending from the main body part to support vehicle components, and a plurality of rib portions configured to connect the support portions and the main body part, respectively, and the vehicle support structure being formed by gravity casting using a mold with a sprue and a strain relief above the sprue. The method including forming a lightening portion by casting on the side of the strain relief at least in one of the rib portions remote from the sprue.

According to this configuration, the lightening portion is formed by casting on the side of the strain relief in one of the rib portions. In this way, the unnecessary portions are reduced by the lightening portion while securing the required rigidity, and casting speed can be increased.

As a result, blowholes can be prevented, thereby improving casting quality.

Preferably, the external component mounting portion may be formed in the lightening portion by machining. With this configuration, the machining allowance at the time of machining the external component mounting portion can be reduced to the minimum required.

According to the configuration of the present disclosure, it is possible to provide the vehicle support structure which is capable of reducing the machining allowance of the external component mounting portion to the minimum required while ensuring the required rigidity. Furthermore, since the unnecessary portions are reduced by the lightening portion, blowholes can be prevented, thereby improving casting quality.

DETAILED DESCRIPTION

Figure 1:
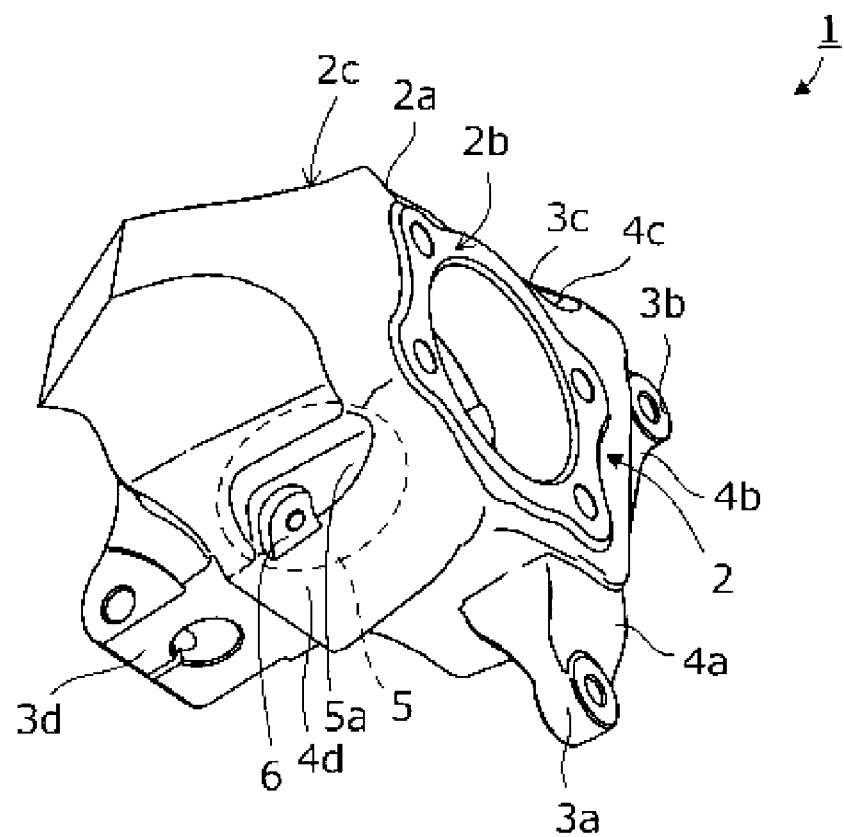
FIG. 1 is a schematic perspective view showing an example of a vehicle support structure according to an embodiment of the present disclosure.
Figure 1:
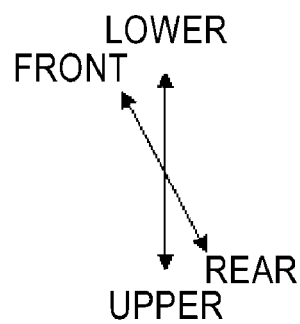
Figure 2:
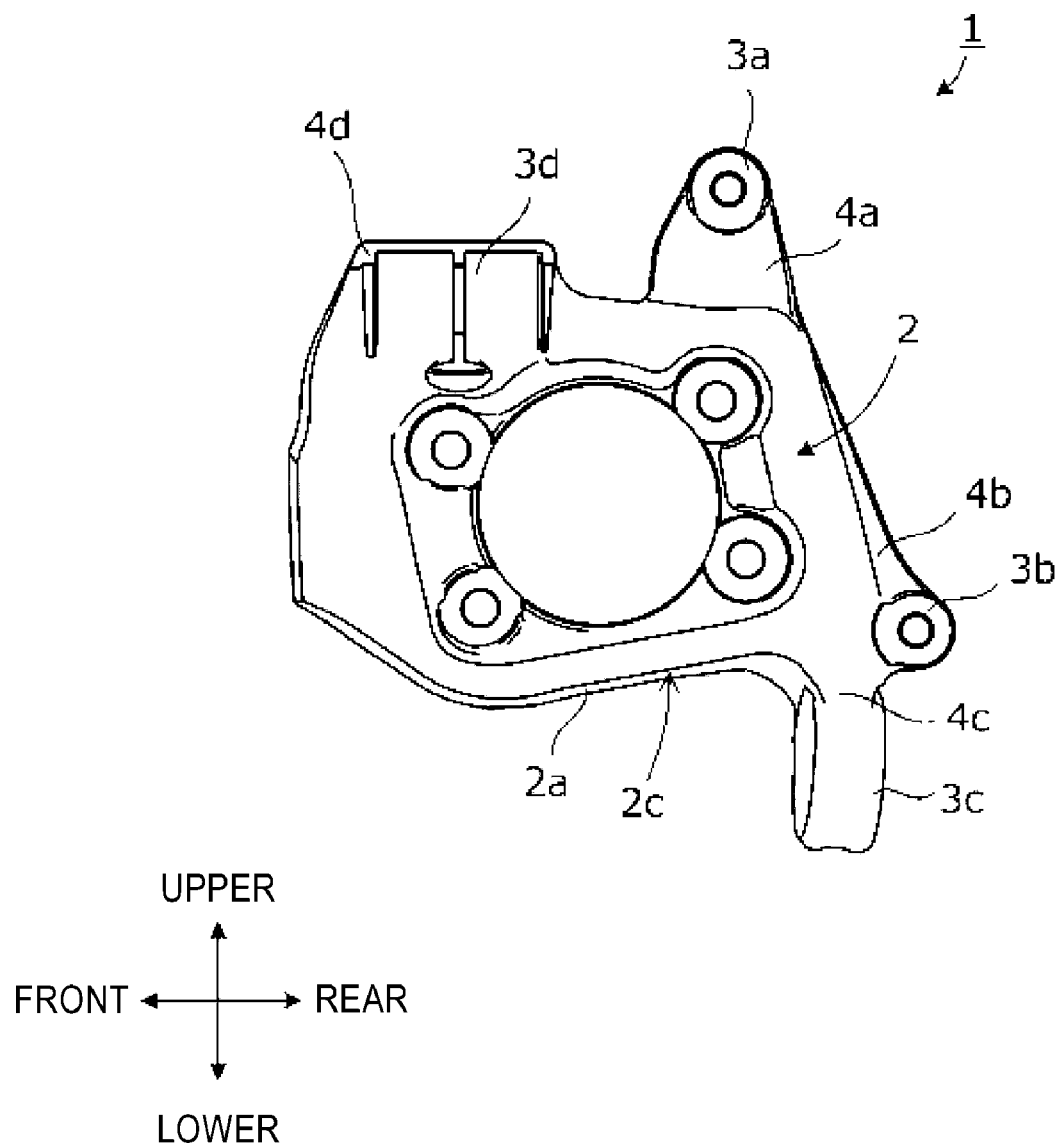
FIG. 2 is a schematic side view of FIG. 1.

Hereinafter, an embodiment of the present disclosure will be described in detail with reference to the drawings. FIG. 1 is a schematic perspective view showing an example of a vehicle support structure 1 according to the present embodiment, and FIG. 2 is a schematic side view of FIG. 1. Meanwhile, for convenience of explanation, in each figure, a front and rear direction and an upper and lower direction of the vehicle support structure 1 and a main body part 2 are indicated by arrows. Further, in all the drawings for explaining the embodiment, members having the same function are denoted by the same reference numerals, and the repeated description thereof may be omitted.

As shown in FIGS. 1 and 2, the vehicle support structure 1 according to the present embodiment is, for example, a steering knuckle. The vehicle support structure 1 includes the main body part 2 attached to a vehicle side, a plurality of support portions 3a, 3b, 3c, 3d for supporting vehicle components on a side surface portion 2c extending from the main body part 2, and a plurality of rib portions 4a, 4b, 4c, 4d for connecting the support portions and the main body part 2, respectively. The vehicle support structure 1 is formed by casting aluminum or aluminum alloy.

As an example, the support portion 3d having a structure in which an upper arm is inserted and fastened with fastening parts such as bolts is provided on an upper portion of the main body part 2. As an example, the support portion 3a and the support portion 3b are caliper mounting portions, and the support portion 3c is a lateral link mounting portion on the rear side.

In the present embodiment, a lightening portion 5 is formed in a portion surrounded by a broken line in the rib portion 4d connecting the support portion 3d and the main body part 2. The lightening portion 5 is formed by casting and has a casted surface 5a. An external component mounting portion 6 is formed in the lightening portion 5 by machining.

In the example shown in FIG. 1, the width of the support portion 3d is set to be large among the support portions. Further, the rib portion 4d has a structure connected to the main body part 2 at the time of casting, so that the rib portion 4d is unnecessarily thick. By forming the lightening portion 5 in the rib portion 4d, unnecessary portions can be easily removed.

Subsequently, the method of manufacturing the vehicle support structure 1 according to the present embodiment will be described below.

As an example, a mold is configured such that a sprue 2a is provided on the side surface portion 2c and a strain relief 2b is provided on the upper side of the main body part 2. Molten metal is poured into the mold from the sprue 2a and the strain relief 2b is caused to face upward, so that the vehicle support structure is formed by gravity casting. Further, the lightening portion 5 is formed by casting on the side of the strain relief 2b in the rib portion 4d. In this way, the vehicle support structure has a relief shape that does not require undercut processing, and can be easily cast. Further, the unnecessary portions of the rib portion 4d remote from the sprue 2a on the side of the strain relief 2b are reduced by the lightening portion 5 while ensuring the required rigidity, and casting speed can be increased. As a result, blowholes can be prevented, thereby improving casting quality.

Figure 3:
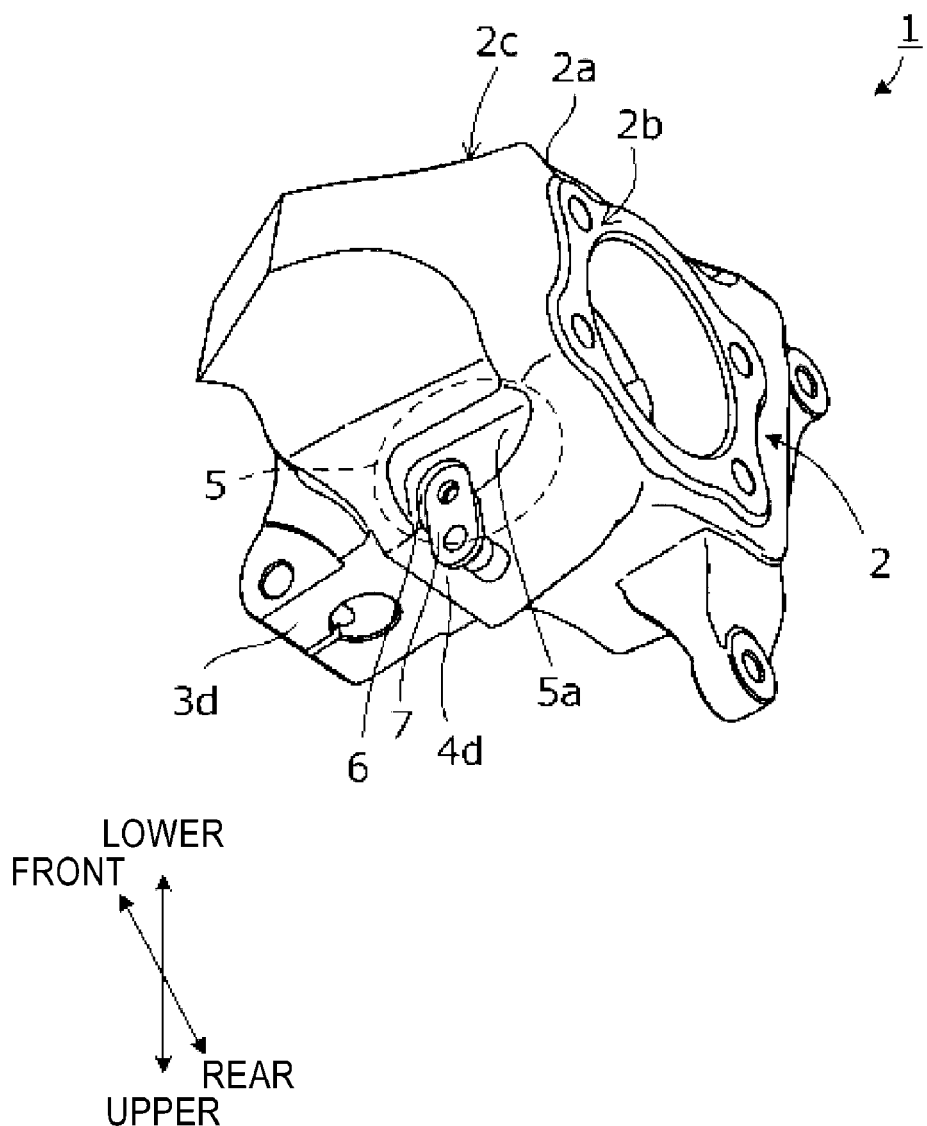
FIG. 3 is a schematic perspective view showing an example of a state in which an external component is disposed in FIG. 1.

After casting, an external component mounting portion 6 is formed in the lightening portion 5 by machining such as cutting or grinding. In this way, the machining allowance at the time of machining the external component mounting portion 6 can be reduced to the minimum required. FIG. 3 is a schematic perspective view showing an example of a state in which a brake hose bracket is disposed as an external component 7.

The present disclosure is not limited to the embodiments described above, and various changes can be made without departing from the scope of the disclosure.

What is claimed is:

1. A vehicle support structure formed by casting, the vehicle support structure comprising:
   a main body part;
   a plurality of support portions extending from the main body part to support vehicle components, and
   a plurality of rib portions configured to connect the support portions and the main body part, respectively,
   wherein a casted lightening portion is located at least in one of the rib portions, and
   wherein an external component mounting portion is formed in the casted lightening portion, and a portion of a sidewall of the casted lightening portion has an opening that is continuous with a portion of a sidewall of the external component mounting portion.

2. The vehicle support structure according to claim 1, wherein the vehicle support structure is made of aluminum or aluminum alloy.

3. The vehicle support structure according to claim 2, wherein the one rib portion in which the casted lightening portion is formed connects the largest one of the support portions and the main body part.

4. The vehicle support structure according to claim 1, wherein the one rib portion in which the casted lightening portion is formed connects the largest one of the support portions and the main body part.

5. The vehicle support structure according to claim 1, wherein the external component mounting portion comprises a machined surface and a surface of the casted lightening portion comprises a casted surface, different from the machined surface.

6. The vehicle support structure according to claim 5, wherein the external component mounting portion is in a different orientation than mounting holes in at least one of the plurality of support portions.

7. The vehicle support structure according to claim 6, wherein the external component mounting portion is in a different orientation than mounting holes in two of the plurality of support portions.

8. The vehicle support structure according to claim 6, wherein the external component mounting portion is in a same orientation as a mounting hole in another of the plurality of support portions.

9. The vehicle support structure according to claim 6, wherein the external component mounting portion and the surface of the casted lightening portion both extend to an edge of one of the plurality of rib portions that connects the one of the plurality of support portions and the main body part.

10. The vehicle support structure according to claim 6, wherein the external component mounting portion forms a stepped portion at the edge of the surface in the casted lightening portion.

11. The vehicle support structure according to claim 6, wherein the vehicle support structure is a steering knuckle.

12. The vehicle support structure according to claim 6, wherein the plurality of support portions comprise four support portions each of which extend from a side portion of the main body.

13. The vehicle support structure according to claim 12, wherein the plurality of rib portions comprise four rib portions which connect the four support portions to the main body.

14. The vehicle support structure according to claim 13, wherein the plurality of support portions comprise two caliper mounting portions and a lateral link mounting portion on a rear side of the main body.

15. The vehicle support structure according to claim 14, wherein the lightening portion is formed in a rib portion connecting the one of the support portions and the main body part.

16. The vehicle support structure according to claim 15, wherein the one of the support portions has a width larger than remaining support portions.

17. The vehicle support structure according to claim 5, further comprising an opening in the external component mounting portion, remote from the edge of the surface in the casted lightening portion.

\* \* \* \* \*